United States Patent [19]

Chabat-Courrède

[11] Patent Number: 4,527,415

[45] Date of Patent: Jul. 9, 1985

[54] APPARATUS FOR CHECKING THE SET PRESSURE OF A SAFETY VALVE

[75] Inventor: Jean Chabat-Courrède, Moret S. Loing, France

[73] Assignee: Electricite de France (Service National), Paris, France

[21] Appl. No.: 546,504

[22] Filed: Oct. 28, 1983

[30] Foreign Application Priority Data

Nov. 10, 1982 [FR] France ............... 82 18880

[51] Int. Cl.³ .................................. G01L 27/00
[52] U.S. Cl. ........................................ 73/4 R
[58] Field of Search ......................... 73/4 R, 706

[56] References Cited

U.S. PATENT DOCUMENTS

| | | | |
|---|---|---|---|
| 2,178,901 | 11/1939 | Webster | 73/4 R |
| 2,419,293 | 4/1947 | Simonson | 73/4 R |
| 3,097,516 | 7/1963 | Reed et al. | 73/4 R |
| 3,768,299 | 10/1973 | Garren | 73/4 R |
| 4,297,891 | 11/1981 | Falcon | 73/706 X |

*Primary Examiner*—Kenneth M. Schor
*Attorney, Agent, or Firm*—Ladas & Parry

[57] ABSTRACT

The apparatus for checking the set pressure of a safety valve (300) comprises: a first tank (100) filled with a first fluid (110) at a pressure less than the set pressure, and connected to the fluid inlet tubing (310) of the valve; a second tank (200) filled with a second fluid (210) at a pressure greater than the set pressure; means (410) for rapidly putting the two tanks into communication with each other; and means (500, 510, 520) for simultaneously measuring the pressure in the fluid inlet tubing and the displacement of the valve plate.

6 Claims, 2 Drawing Figures

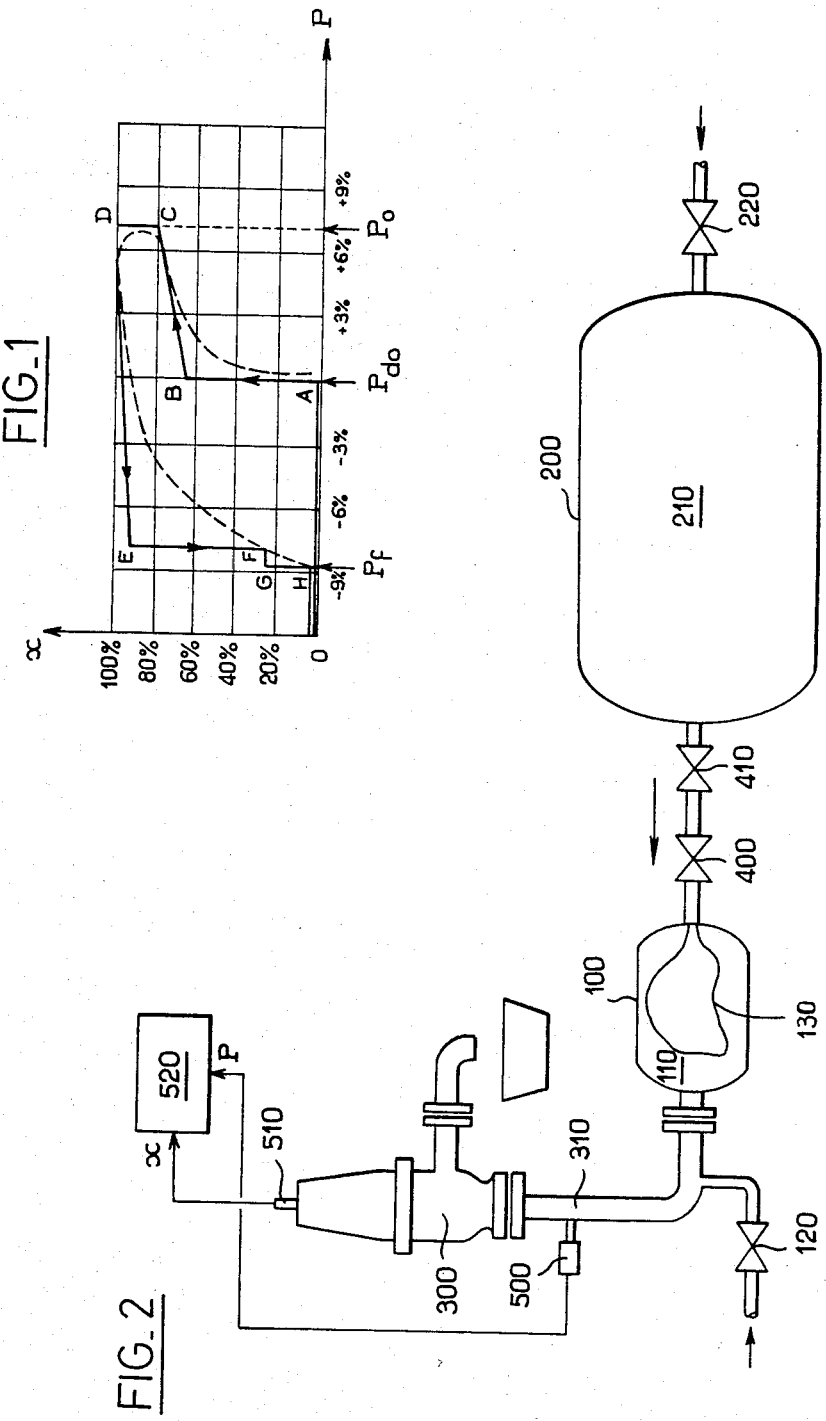

APPARATUS FOR CHECKING THE SET PRESSURE OF A SAFETY VALVE

The present invention relates to apparatus for checking the set pressure of a safety valve.

BACKGROUND OF THE INVENTION

Such valves are intended to open when the pressure in their fluid inlet tubing exceeds a predetermined value, known as the set pressure. The fluid under pressure is generally air or steam.

The operations of setting the pressure of a safety valve and of checking the value of the set pressure are not generally performed directly on the installation which uses the safety valve, but rather on a test bench.

A first difficulty stems from the setting conditions on a bench not being the same as the real operating conditions, for example temperature and the back pressure downstream from the valve. This requires corrections to be made relative to the setting as made on the bench.

It has been observed that a valve releases, ie. its valve plate lifts, in a manner which is neither complete nor immediate. Accompanying FIG. 1 plots the displacement x of the valve plate as a function of pressure P for a valve operating in an industrial installation. The full line is the theoretical curve while the dashed line is the real curve.

The portion ABCD corresponds to the valve releasing under increasing pressure: for a given pressure $P_{do}$ referred to as the "beginning of release pressure", a sharp valve plate lift is observed (line AB) corresponding to the plate losing contact with its seat and to equilibrium being established between the force exerted by the pressure at the beginning of release and the forces applied by the setting spring. To fully open the valve (point D) the pressure must be increased to a value $P_o$ referred to as the "opening" pressure.

On closure (portion DEFGH of the curve) with falling pressure, the pressure must drop to a value $P_f$ referred to as the closure pressure.

The significant parameter of the valve's operation which needs to be measured accurately is the beginning-of-release pressure, ie. the pressure at which the plate lifts significantly.

A first currently proposed method of bench setting consists in progressively increasing the air pressure upstream from the valve and in waiting for the bang which marks the beginning of release: the corresponding pressure is then noted. However, this method has the drawback of requiring the flow geometry upstream from the valve to be modified to take account of the differences compared with real operating conditions. In particular, the valve plate must be enabled to lift even under small fluid flow (the flow available to a bench installation). This effect is obtained by modifying the flow geometry upstream from the valve, eg. by changing the position of a ring screwed onto a part called the "nozzle" and forming the valve seat. Maximum lifting force is thus obtained under conditions which are practically static (very low flow rate).

Further, the pressure must rise with a steep enough gradient to compensate for losses just before the beginning of release when air begins to stream out.

In a second method which is also currently proposed and which does not require the flow geometry of the valve to be modified, the fluid is water, and valve opening is detected visually. However, there is a risk of confusion between the range over which the valve is no longer fully sealed (the valve starts sweating) and the genuine beginning of valve release. Visual examination is less accurate in this respect than hearing the bang of the previous method. Further, since the pressure rises with a gradient which is ill defined, there is a danger of bouncing which will damage the valve.

Preferred embodiments of the present invention remedy the drawbacks of both of these known methods by recreating on the bench the real conditions of instantaneous flow rate found in use, in conjunction with a steep pressure gradient.

SUMMARY OF THE INVENTION

The present invention provides apparatus for checking the set pressure of a safety valve having inlet tubing and a valve plate which is displaced whenever the fluid pressure in said inlet tubing is greater than said set pressure, wherein the apparatus comprises:

a first tank filled with a first fluid at a pressure less than the set pressure to be checked, and connectable to the fluid inlet tubing of a safety valve to be checked;

a second tank filled with a second fluid at a pressure greater than said set pressure;

rapid communication means for rapidly putting said first and second tanks into communication with each other; and means connectable to a valve to be checked to measure both the pressure in said fluid inlet tubing and the displacement of said valve plate simultaneously.

Preferably, means are provided for isolating the first fluid from the second fluid, eg. a deformable membrane disposed inside the second tank.

BRIEF DESCRIPTION OF THE DRAWING

An embodiment of the invention is described by way of example with reference to the accompanying drawing, in which:

FIG. 1 is a plot of valve plate displacement as a function of inlet pressure, and is described above; and FIG. 2 is a diagram of apparatus in accordance with the invention.

MORE DETAILED DESCRIPTION

In FIG. 2, reference 100 designates the first tank which is filled with a fluid 110 under pressure, and which communicates with the fluid inlet tubing 310 of the safety valve 300.

The fluid 110 hereinafter called "thrusted" fluid may be water, which has the advantage of being incompressible, or a gas such as air. The use of a gas is preferred in that it does not cause bouncing at the instant of measurement, and does not have destructive effects on the valve.

The tank 100 is filled with thrusted fluid via a cock 120 to a pressure lying between 80% and 95% of the valve set pressure, and preferably to 90% of said value.

The second tank 200 contains a "thrusting" fluid 210. The volume of this tank is greater than that of the tank 100, and is preferably two to six times greater.

The thrusting fluid is generally a gas, eg. compressed air, which is admitted into the tank 210 via a cock 220 at a pressure which is greater than the pressure in the tank 100 of thrusted fluid, and which is also greater than the set pressure of the valve. Advantageously, the pressure of the thrusting fluid lies between 110% and 140% of the set pressure, and is preferably 120% to 130% thereof.

The two tanks are isolated from each other by a rapid opening cock 10. An adjusting cock 400 is preferably also provided to adjust the flow rate of the thrusting fluid into the tank 100.

A flexible membrane 130 is preferably placed inside the first tank 100 to isolate the thrusting fluid from the thrusted fluid. This makes it possible to ensure that the volume of fluid which is made to pass through the valve remains below a predetermined value.

The measuring means comprise a sensor 500 for sensing the instantaneous pressure in the fluid inlet tubing 310 and a sensor 510 for sensing valve plate displacement. The two sensors are connenected to a circuit 520 for simultaneously measuring and recording both of the sensed values. A low inertia recorder such as a mirror galvanometer is used in preference to a pen recorder system.

A measurement is performed by opening the rapid opening cock 410. The thrusting fluid then suddenly fills the membrane 130 giving rise to a steep rise of pressure in the thrusted fluid. The measurement is thus performed over a short time inteval (less than 1 second) with a high flow rate of fluid which corresponds to normal service conditions, thereby obtaining a significant rise in the valve plate.

Examination of the measurement results showing opening as a function of pressure then makes it possible to determine accurately the looked-for beginning of release pressure. The corresponding degree of valve plate lift may also be determinable.

I claim:

1. Apparatus for measuring the set pressure of a safety valve having inlet tubing and a valve plate which is displaced whenever the fluid pressure in said inlet tubing is greater than said set pressure, wherein the apparatus comprises said safety valve being in combination with:
   a first tank filled with a first fluid at a pressure less than the set pressure to be checked, and connected to the fluid inlet tubing of the safety valve to be checked;
   a second tank filled with a second fluid at a pressure greater than said set pressure;
   rapid communication means for rapidly putting said first and second tanks into fluid pressure communication with each other;
   means connected to the valve to be checked, to measure both the pressure in said fluid inlet tubing and the displacement of said valve plate simultaneously; and means for isolating said first fluid from said second fluid, while the tanks are in fluid pressure communication with each other.

2. Apparatus according to claim 1, wherein said means for isolating said first and second fluids comprise a deformable membrane disposed inside said first tank.

3. Apparatus according to claim 1, wherein the volume of said second tank is between 2 to 6 times the volume of said first tank.

4. Apparatus according to claim 1, wherein the pressure inside said first tank lies between 80% and 95% of said set pressure to be checked.

5. Apparatus according to claim 1, wherein the pressure inside said second tank lies between 110% and 140% of said set pressure to be checked.

6. Apparatus according to claim 1, wherein a flow rate controlling cock is provided in series with said rapid communication means.

* * * * *